US010025349B2

(12) United States Patent
Kita (10) Patent No.: US 10,025,349 B2
(45) Date of Patent: Jul. 17, 2018

(54) ELECTRONIC DEVICE, SETTING METHOD AND COMPUTER READABLE RECORDING MEDIUM HAVING PROGRAM THEREOF (71) Applicant: CASIO COMPUTER CO., LTD., Tokyo (JP)

(72) Inventor: Kazunori Kita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 580 days.

(21) Appl. No.: 14/517,037

(22) Filed: Oct. 17, 2014

(65) Prior Publication Data

US 2015/0149117 A1    May 28, 2015

(30) Foreign Application Priority Data

Oct. 17, 2013   (JP) .................................. 2013-216469

(51) Int. Cl.
G06F 1/16       (2006.01)
G04G 21/02      (2010.01)
G04G 21/04      (2013.01)

(52) U.S. Cl.
CPC ............. *G06F 1/163* (2013.01); *G04G 21/02* (2013.01); *G04G 21/04* (2013.01)

(58) Field of Classification Search
CPC ....................................................... G06F 1/163
See application file for complete search history.

(56) References Cited

U.S. PATENT DOCUMENTS 7,725,842 B2 *  5/2010  Bronkema .......... G06F 19/3481
                                                715/744
8,762,756 B1 *  6/2014  Moy ........................ G06F 1/32
                                                713/321
(Continued)

FOREIGN PATENT DOCUMENTS

JP    2001-327472 A    11/2001
JP    2004-297126 A    10/2004
(Continued)

OTHER PUBLICATIONS

Notification of Reasons for Refusal dated Aug. 29, 2017 received in Japanese Patent Application No. JP 2013-216469 together with an English language translation.

*Primary Examiner* — Manuel L Barbee
*Assistant Examiner* — Raymond Nimox
(74) *Attorney, Agent, or Firm* — Scully, Scott, Murphy & Presser, P.C.

(57) ABSTRACT

The present invention provides an electronic device including a situation detecting unit for detecting the present situation of a user, an acquiring unit for acquiring previously stored information on life log of the user, a situation determining unit for determining whether or not the present situation of the user conforms to a behavior pattern based on the life log information, a device setting unit for setting the function of the electronic device in accordance with the behavior pattern in the case that the situation determining unit determines that the present situation of the user conforms to the behavior pattern based on the life log information, and a life log information detecting unit for detecting life log information in the case that the situation determining unit determines that the present situation of the user does not conform to the behavior pattern based on the life log information.

14 Claims, 4 Drawing Sheets

(56) References Cited

U.S. PATENT DOCUMENTS

| | | | | |
|---|---|---|---|---|
| 8,776,171 B2* | 7/2014 | Piersol | G06F 21/316 | 707/608 |
| 8,990,129 B1* | 3/2015 | Rowe | H04N 21/2547 | 706/12 |
| 9,318,029 B2* | 4/2016 | Katz | G09B 19/00 | |
| 2001/0049471 A1* | 12/2001 | Suzuki | A61B 5/0002 | 600/300 |
| 2004/0210117 A1* | 10/2004 | Ueno | A61B 5/0002 | 600/300 |
| 2004/0247748 A1* | 12/2004 | Bronkema | G06F 19/3481 | 426/106 |
| 2008/0032270 A1* | 2/2008 | Katz | G06Q 50/22 | 434/236 |
| 2010/0115610 A1* | 5/2010 | Tredoux | G06F 21/316 | 726/19 |
| 2011/0130953 A1* | 6/2011 | Ohishi | G01C 21/3617 | 701/532 |
| 2011/0137836 A1* | 6/2011 | Kuriyama | A61B 5/1118 | 706/12 |
| 2012/0086806 A1* | 4/2012 | Hiramine | G06F 21/316 | 348/143 |
| 2012/0233482 A1* | 9/2012 | Piersol | G06F 1/3265 | 713/323 |
| 2012/0317064 A1* | 12/2012 | Hagiwara | A61B 5/6898 | 706/46 |
| 2013/0122928 A1* | 5/2013 | Pfluger | G01P 13/00 | 455/456.1 |
| 2013/0232354 A1* | 9/2013 | Ono | G06F 1/32 | 713/320 |
| 2014/0236967 A1* | 8/2014 | Kawano | G06Q 10/10 | 707/748 |
| 2014/0335490 A1* | 11/2014 | Baarman | A61B 5/002 | 434/236 |
| 2015/0154639 A1* | 6/2015 | Dupont | G06Q 30/0261 | 705/14.53 |
| 2016/0055044 A1* | 2/2016 | Kawai | G06N 99/005 | 714/26 |

FOREIGN PATENT DOCUMENTS

| | | |
|---|---|---|
| JP | 2012-123534 A | 6/2012 |
| JP | 2013-138553 A | 7/2013 |
| WO | 2011/024425 A1 | 3/2011 |

* cited by examiner

ELECTRONIC DEVICE, SETTING METHOD AND COMPUTER READABLE RECORDING MEDIUM HAVING PROGRAM THEREOF

CROSS-REFERENCE TO RELATED APPLICATIONS

This application is based upon and claims the benefit of priority under 35 USC 119 of Japanese Patent Application No. 2013-216469 filed on Oct. 17, 2013, the entire disclosure of which is incorporated herein by reference in its entirety for all purposes.

BACKGROUND OF THE INVENTION

1. Field of the Invention

The present invention relates to an electronic device, a setting method and a computer readable recording medium having program thereof.

2. Description of the Related Art

Conventionally, there have been known electronic devices capable of recording information on a user's activities in daily life (i.e. life log).

For example, a terminal device called as a smart watch recently developed can detect a distance or a period of time while a user is jogging and store it therein or in a server connected via a network.

Japanese Patent Application Laid-Open Publication No. 2004-297126 published on Dec. 21, 2004, discloses a terminal device for recording a user's activities and downloading software during a period of time when the user is likely not to use the terminal device.

While it is desirable for the terminal devices such as a smart watch to suppress power consumption because they are driven by a battery, the processing for acquiring life log tends to increase power consumption because it activates various sensors. Further, in the case of putting power supply of various sensors to an off state or a sleep state, a wait time is necessary to activate the terminal devices when a user is going to use them.

Thus, for conventional electronic devices capable of recording life log, it has been impossible to improve user convenience sufficiently while suppressing power consumption.

SUMMARY OF THE INVENTION

An object of the present invention is to improve convenience by automatically changing settings of the function of electronic devices capable of recording life log according to situations where they are being used.

According to one embodiment of the present invention, an electronic device is provided. The electronic device includes a situation detecting unit configured to detect the present situation of a user, an acquiring unit configured to acquire previously stored information on life log of the user including location information, a situation determining unit configured to determine whether or not the present situation of the user detected by the situation detecting unit conforms to a behavior pattern based on the life log information acquired by the acquiring unit, a device setting unit configured to set the function of the electronic device in accordance with the behavior pattern in the case that the situation determining unit determines that the present situation of the user conforms to the behavior pattern based on the life log information, a life log information detecting unit configured to detect life log information in the case that the situation determining unit determines that the present situation of the user does not conform to the behavior pattern based on the life log information, wherein the device setting unit sets the function of the electronic device based on the life log information detected by the life log information detecting unit in the case that the situation determining unit determines that the present situation of the user does not conform to the behavior pattern based on the life log information.

According to one embodiment of the present invention, an electronic device is provided. The electronic device includes a situation detecting unit configured to detect the present situation of a user, an acquiring unit configured to acquire previously stored information on life log of the user including location information, a situation determining unit configured to determine whether or not the present situation of the user detected by the situation detecting unit conforms to a behavior pattern based on the life log information acquired by the acquiring unit, and a device setting unit configured to set the function of the electronic device in accordance with the behavior pattern in the case that the situation determining unit determines that the present situation of the user conforms to the behavior pattern based on the life log information, wherein, the situation determining unit further determines whether or not there is a behavior pattern based on the life log information similar to the present situation in the case of determining that the present situation does not conform to the behavior pattern based on the life log information, and in the case that the situation determining unit determines that there is a behavior pattern based on the life log information similar to the present situation, the device setting unit sets the function of the electronic device in accordance with the similar behavior pattern based on the life log information.

According to one embodiment of the present invention, a method for setting an electronic device is provided. The method includes a situation detecting step of detecting the present situation of a user, an acquiring step of acquiring previously stored information on life log of the user including location information, a situation determining step of determining whether or not the present situation of the user detected at the situation detecting step conforms to a behavior pattern based on the life log information acquired at the acquiring step, a device setting step of, in the case that it is determined at the situation determining step that the present situation of the user conforms to the behavior pattern based on the life log information, setting the function of the electronic device in accordance with the behavior pattern, and a life log information detecting step of, in the case that it is determined at the situation determining step that the present situation of the user does not conform to the behavior pattern based on the life log information, detecting life log information, wherein the device setting step sets the function of the electronic device based on the life log information detected at the life log information detecting step in the case that it is determined at the situation determining step that the present situation of the user does not conform to the behavior pattern based on the life log information.

According to another embodiment of the present invention, a recording medium for recording a program readable by a computer controlling an electronic device is provided. The program controls the computer to perform functions including situation detecting processing for detecting the present situation of a user, acquiring processing for acquiring previously stored information on life log of the user including location information, situation determining processing for determining whether or not the present situation of the user detected by the situation detecting processing conforms to a behavior pattern based on the life log information acquired by the acquiring processing, device setting processing for setting the function of the electronic device in accordance with the behavior pattern in the case that it is determined by the situation determining processing that the present situation of the user conforms to the behavior pattern based on the life log information, and life log information detecting processing for detecting life log information in the case that it is determined by the situation determining processing that the present situation of the user does not conform to the behavior pattern based on the life log information, wherein the device setting processing sets the function of the electronic device based on the life log information detected by the life log information detecting processing in the case that it is determined by the situation determining processing that the present situation of the user does not conform to the behavior pattern based on the life log information.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIGS. 1A and 1B show configurations of a wrist terminal 1 which is an embodiment of an electronic device of the present invention.

FIG. 2 is a functional block diagram showing a functional configuration of the wrist terminal 1 for performing an activity supporting process.

DETAILED DESCRIPTION OF THE PREFERRED EMBODIMENT

Hereinafter, embodiments of the present invention will be described with reference to the accompanying drawings.

(Hardware Configuration)

Figure 1A:
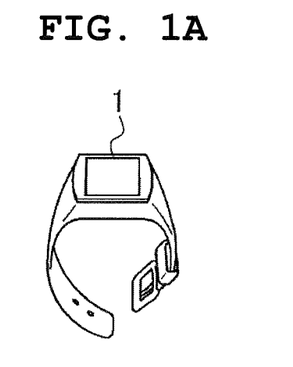
FIG. 1A shows an exterior configuration and FIG. 1B is a block diagram showing a hardware configuration of the wrist terminal 1.
Figure 1B:
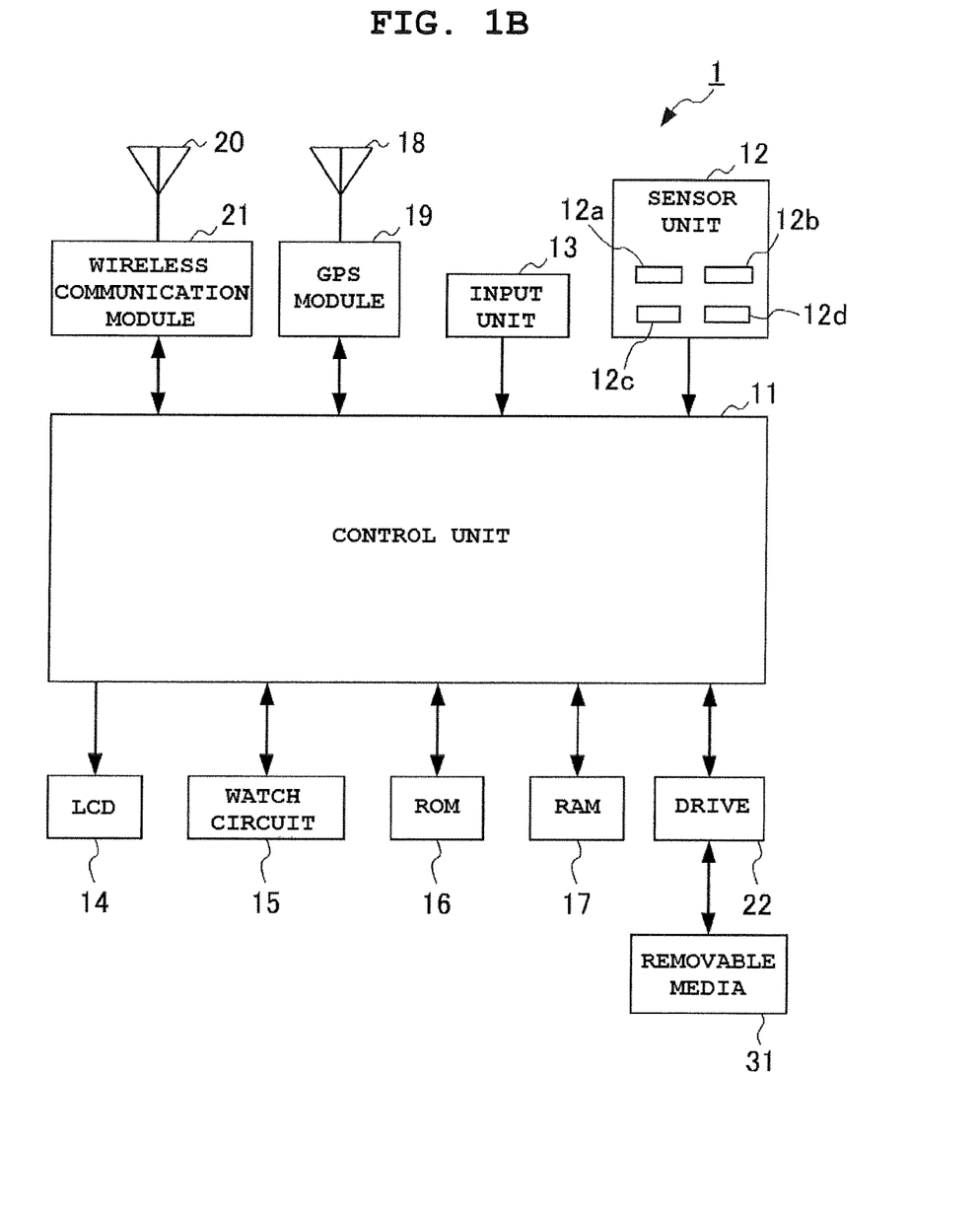

FIGS. 1A and 1B show configurations of a wrist terminal 1 which is an embodiment of an electronic device of the present invention. FIG. 1A shows an exterior configuration and FIG. 1B is a block diagram showing a hardware configuration of the wrist terminal 1.

As shown in FIG. 1B, the wrist terminal 1 includes a control unit 11, a sensor unit 12, an input unit 13, an LCD (Liquid Crystal Display) 14, a watch circuit 15, a ROM (Read Only Memory) 16, a RAM (Read Access Memory) 17, a GPS (Global Positioning System) antenna 18, a GPS module 19, a wireless communication antenna 20, a wireless communication module 21, and a drive 22.

The control unit 11 includes a processing unit such as a CPU (Central Processing Unit) and controls operations of the wrist terminal 1. For example, the control unit 11 performs various processes according to programs stored in the ROM 16 such as a program for an activity supporting process (as described below).

The sensor unit 12 includes a 3-axis acceleration sensor 12a, a magnetic sensor 12b, a pressure sensor 12c, and a temperature sensor 12d.

The 3-axis acceleration sensor 12a detects acceleration of the wrist terminal 1 and outputs information indicating the detected acceleration to the control unit 11.

The magnetic sensor 12b detects a magnetic field at the wrist terminal 1 and outputs information indicating the detected magnetic field (for example, bearings) to the control unit 11. In the present embodiment, the magnetic sensor 12b detects a magnetic field for three straight axes of x-axis, y-axis and z-axis at right angles to one another. The magnetic sensor 12b may detect a magnetic field for two of the three axes of x-axis, y-axis and z-axis.

The pressure sensor 12c detects pressure at the wrist terminal 1 and outputs information indicating the detected pressure to the control unit 11.

The temperature sensor 12d detects temperature at the wrist terminal 1 and outputs information indicating the detected temperature to the control unit 11.

The sensor unit 12 may include other sensors such as a gyro sensor or a blood pressure sensor in addition to the 3-axis acceleration sensor 12a, the magnetic sensor 12b, the pressure sensor 12c and/or the temperature sensor 12d.

The input unit 13 includes a plurality of buttons (which may include software buttons as well as hardware buttons) used to input various pieces of information to the control unit 11.

The LCD 14 displays various pieces of information on a time of day, directions, life log (for example, previous jogging records), or the like, according to instructions from the control unit 11.

The watch circuit 15 generates time signals from signals generated by a system clock or an oscillator and outputs the present time of day.

The ROM 16 stores information such as control programs executed in the control unit 11.

The RAM 17 provides a work area necessary for the control unit 11 to perform various processes.

The GPS antenna 18 receives electromagnetic waves sent from a satellite of a GPS system, converts them to electric signals, and outputs the converted electrical signals (hereinafter, referred to as "GPS signals") to the GPS module 19.

The GPS module 19 detects the location of the wrist terminal 1 (latitude, longitude, altitude) and the present time of day indicated by the GPS based on the GPS signals input from the GPS antenna 18. The GPS module 19 outputs information indicating the detected location and the present time of day to the control module 11.

The wireless communication antenna 20 is an antenna which can receive electromagnetic waves of a frequency corresponding to a wireless communication method used by the wireless communication module 21, and includes a loop antenna or a rod antenna, for example. The wireless communication antenna 20 transmits electric signals for wireless communication input from the wireless communication module 21 in an electromagnetic wave form and/or converts the received electromagnetic waves to electric signals to output them to the wireless communication module 21.

The wireless communication module 21 transmits signals to other devices via the wireless communication antenna 20 according to instructions of the control unit 11. Further, the wireless communication module 21 receives signals transmitted from other devices and outputs information indicated by the received signals to the control unit 11.

A removable media 31 including a magnetic disk, an optical disk, a magneto-optical disk, a semiconductor disk, or the like, is mounted on the drive 21. Various pieces of information such as information on a user's life log can be stored in the removable media 31.

(Functional Configuration)

Next, a functional configuration of the wrist terminal 1 is described.

FIG. 2 is a functional block diagram showing a functional configuration of the wrist terminal 1 for performing an activity supporting process.

The activity supporting process means a sequence of steps for referring to the life log recorded for a user of the wrist terminal 1 to set the wrist terminal 1 in advance in accordance with the life log and for determining a present behavior of the user to change settings of the function of the wrist terminal 1 in accordance with the behavior in the case that a setting of the function of the wrist terminal 1 cannot be determined from the life log such as a case that sufficient life log is not accumulated.

It is possible to store the life log in the RAM 17 of the wrist terminal 1 or in a server to which the wrist terminal 1 can connect via a network. In the present embodiment, the life log is stored in a server S to which the wrist terminal 1 can connect via a network.

Further, hereinafter, it is supposed that the user of the wrist terminal 1 has a habit of doing warm-up exercise from about 19:50 and jogging around her house from about 20:00 to about 21:00 every Saturday.

When the activity supporting process is performed, a life log acquiring unit 51, a situation determining unit 52, a life log information detecting unit 53, a life log accumulating unit 54, and a device setting unit 55 function in the control unit 11.

The life log acquiring unit 51 acquires information on the life log (hereinafter, also referred to as "life log information") in the case that a predetermined condition for acquisition is satisfied. Specifically, the life log acquiring unit 51 accesses to the server S at a timing when a predetermined condition for acquisition is satisfied and acquires the information on the life log for the user of the wrist terminal 1. Here, the condition for acquisition can be, for example, when a preset time arrives (for example, a predetermined time (for example, three minutes) before a behavior pattern acquired from the life log starts), when the wrist terminal 1 is worn by the user, or when the wrist terminal 1 is supplied with electric power.

The situation determining unit 52 determines whether or not the present situation is a situation where a behavior pattern identified from the life log is likely to be performed based on the information on the life log acquired by the life log acquiring unit 51 and the information output from the sensor unit 12 and the GPS module 19. For example, the situation determining unit 52 determines whether or not the user is located near a place where a behavior pattern identified from the life log is performed.

It is possible to classify behaviors of which elements, for example, a day of week, a time of day and a behavior description are the same as the same behavior pattern. Specifically, in the case that the user does warm-up exercise and goes jogging around her house (the same behavior description) from 19:50 to about 21:00 every Saturday (the same day of week and the same time zone), it is possible to classify these behaviors done every week as the same behavior pattern.

In the case that the situation determining unit 52 determines that the present situation is the situation where a behavior pattern identified from the life log is likely to be performed, the situation determining unit 52 specifies one or more kinds of functions of the wrist terminal 1 related to the behavior pattern identified from the life log and outputs information indicating the behavior pattern and the specified one or more kinds of functions (device setting reference information which will be described below) to the device setting unit 55. For example, in the case that the behavior pattern identified from the life log is jogging, the functions of positioning by the GPS and display are specified as the kinds of functions of the wrist terminal 1 related to the behavior pattern "jogging" identified from the life log.

In the case that the situation determining unit 52 determines that the present situation is not the situation where a behavior pattern identified from the life log is likely to be performed, the situation determining unit 52 makes the life log information detecting unit 53 perform a process for acquiring information on life log for a predetermined short time period (for example, for about three to five minutes) by activating all the sensors (or some sensors predetermined to acquire information on life log more in a short time period) (hereinafter, referred to as a short-term life log acquiring process). In the short-term life log acquiring process, it is possible to acquire information on life log densely for a short time period by activating all the sensors (or some predetermined sensors). The situation determining unit 52 includes the information on the life log in the server S after the predetermined short time period passes, acquires a behavior pattern from the information on the life log which has been accumulated in the server S, and repeats determination on the user's present situation.

The life log information detecting unit 53 detects information on life log of the user based on information output from various sensors included in the sensor unit 12 and the GPS module 19. For example, the life log information detecting unit 53 detects a travel history of the user as the information on the life log. Specifically, the life log information detecting unit 53 detects a travel time, a travel velocity and a travel route of the user. The user's travel history can be detected based on a location and a present time of day output from the GPS module 19. Further, the life log information detecting unit 53 determines which means of transport is used of walking, transport facilities such as the subway, or exercise such as jogging based on the travel velocity. The life log information detecting unit 53 also detects that the user is exercising by using the information on an acceleration output from the 3-axis acceleration sensor 12*a*. For example, the life log information detecting unit 53 detects whether the user is walking or jogging, or whether the user is doing exercise without traveling (warm-up exercise, tennis, or the like).

In the case that the situation determining unit 52 instructs the life log information detecting unit 53 to perform the short-term life log acquiring process, the life log information detecting unit 53 activates all the sensors (or some predetermined sensors) included in the sensor unit 12 and detects information on life log from the user's behaviors for a predetermined short time period. For example, the life log information detecting unit 53 detects whether or not the user is doing exercise (what kind of exercise she is doing) based on the information output from the 3-axis acceleration sensor 12*a*. Further, the life log information detecting unit 53 detects whether the user is indoors or outdoors based on the information output from the pressure sensor 12*c* and the temperature sensor 12*d*.

Then, the life log information detecting unit 53 outputs the detected life log information to the life log accumulating unit 54 and the device setting unit 55.

The life log accumulating unit 54 accumulates the information on the life log detected by the life log information detecting unit 53 in time series correspondingly to the user. By accumulating the life log by the life log accumulating unit 54, it is possible to identify behavior patterns of the user's life of when, where, what the user did.

As described above, according to the present embodiment, the life log accumulating unit 54 transmits the information on the life log to the server S via the wireless communication module 21 and accumulates the user's life log in the server S.

In the case that the information indicating the kinds of functions of the wrist terminal 1 and the behavior pattern specified by the situation determining unit 52, or, the information on the life log detected by the short-term life log acquiring process (hereinafter, collectively referred to as "device setting reference information") is input to the device setting unit 55, the device setting unit 55 changes settings of the function of the wrist terminal 1 according to the device setting reference information.

For example, in the case that the device setting reference information indicates positioning by the GPS and display as the kinds of functions of the wrist terminal 1 relating to the behavior pattern of "jogging", the device setting unit 55 activates the GPS module 19 and makes it execute positioning quickly for the behavior pattern of "jogging" of which travel speed is faster than walking. Further, the device setting unit 55 sets the display screen to a big-font mode for the behavior pattern of "jogging" where the display screen is visually recognized in the state where the blur is larger than usual (for example, when the user stops). In the case that the device setting reference information indicates the behavior pattern of "travel by a bicycle" detected by the short-term life log acquiring process, the device setting unit 55 activates the GPS module 19 and sets a time interval for positioning by the GPS module 19 shorter than that for "jogging". Further, in the case of "travel by a bicycle", the device setting unit 55 sets the display screen to a normal mode the same as usual because the display screen is visually recognized in the state where the blur is not larger than that for jogging. In the case that a display mode is prepared for the behavior pattern of "travel by a bicycle", the display screen can be set to this display mode desirably.

Thus, in light of the life log, it is possible to change settings of the wrist terminal 1 in accordance with activities which it is regarded the user is going to do or which it is regarded from the present situation the user is doing.

Therefore, the user needs not to manually change settings of the function of the wrist terminal 1 in accordance with her activity and can use necessary functions of the wrist terminal 1 quickly after starting the activity. Further, as it is possible to activate only functions necessary for the user's activity, an increase of power consumption can be suppressed.

Figure 3:
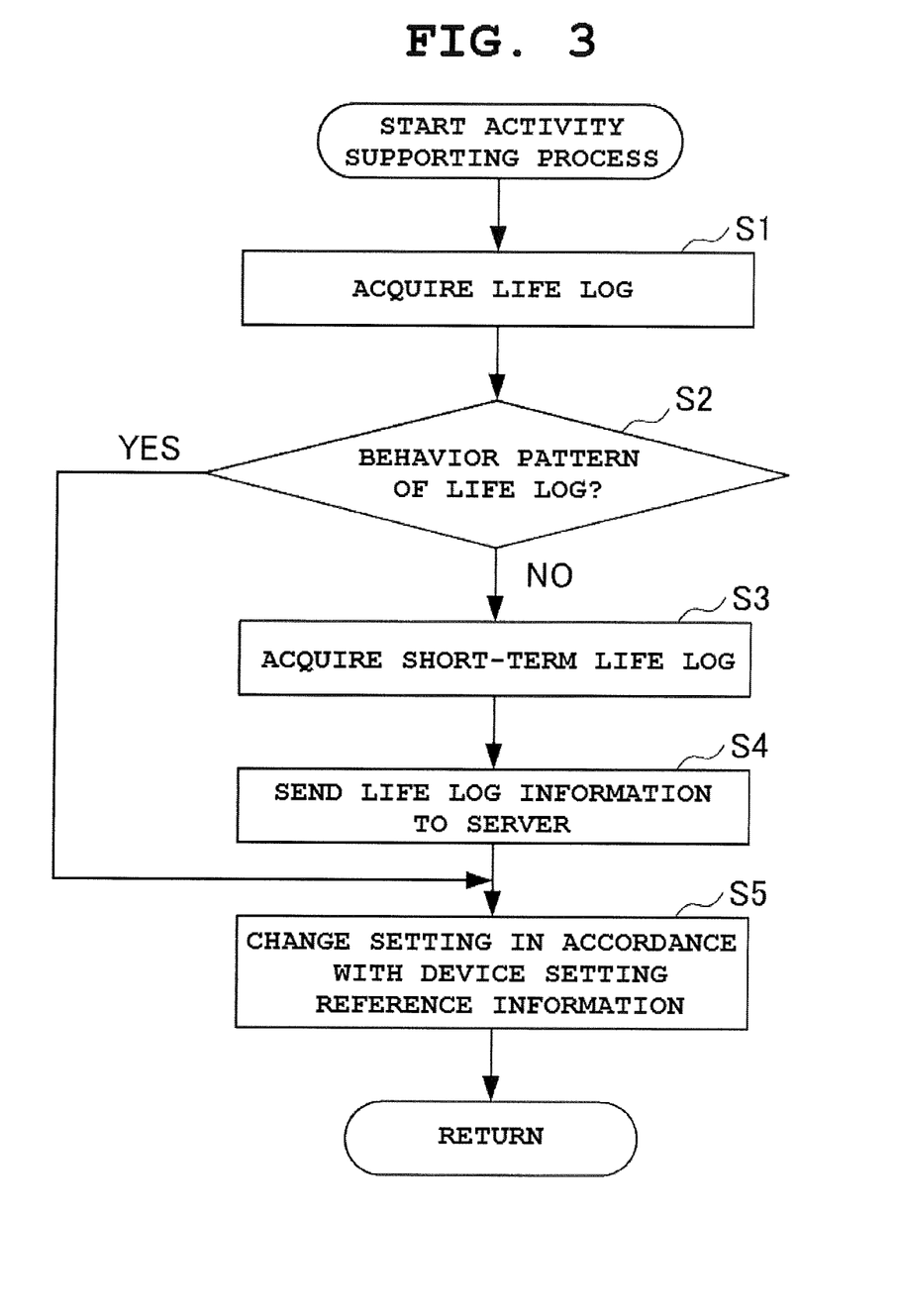
FIG. 3 is a flow chart for explaining the activity supporting process performed by the wrist terminal 1.

FIG. 3 is a flow chart for explaining the activity supporting process performed by the wrist terminal 1.

The activity supporting process is started when the user instructs the activity supporting process to be performed and is repeatedly performed until the user instructs the process to be ended.

At Step S1, the life log acquiring unit 51 accesses to the server S via the network and acquires the information on the life log for the user of the wrist terminal 1.

At Step S2, the situation determining unit 52 determines whether or not the present situation is a situation where a behavior pattern identified from the life log is likely to be performed.

In the case that the present situation is not the situation where a behavior pattern identified from the life log is likely to be performed, the determination at Step S2 is "NO" and the process proceeds to Step S3.

On the other hand, in the case that the present situation is the situation where a behavior pattern identified from the life log is likely to be performed, the determination at Step S2 is "YES" and the process proceeds to Step S5.

At Step S3, the life log information detecting unit 53 performs the short-term life log acquiring process and detects information on life log from the user's behaviors.

At Step S4, the life log accumulating unit 54 transmits the information on the life log detected by the life log information detecting unit 53 to the server S and accumulates the information on the life log in time series correspondingly to the user.

At Step S5, the device setting unit 55 changes settings of the function of the wrist terminal 1 according to the device setting reference information input by the situation determining unit 52 and the life log information detecting unit 53.

After Step S5, the activity supporting process is repeated.

By this, in the case that the present situation is the situation where a behavior pattern identified from the life log is likely to be performed, it is possible to set the wrist terminal 1 in advance properly to the behavior pattern. Further, in the case that the present situation is not the situation where a behavior pattern identified from the life log is likely to be performed, the short-term life log acquiring process is performed and information on life log is densely acquired for a short time period. Thus, it is possible to set the wrist terminal 1 properly to the present behavior.

Further, the information on the life log acquired by the short-term life log acquiring process is accumulated in the server S and is again referred to for the activity supporting process in combination with information on life log previously stored.

In the case that a new behavior pattern is formed by merging the information on the life log acquired by the short-term life log acquiring process with the previously stored information on the life log, it is possible to set the wrist terminal 1 in advance properly to the behavior pattern when the behavior pattern is likely to be performed.

In other words, according to the wrist terminal 1 of the present embodiment, it is possible to change settings of the function of an electronic device capable of recording life log properly to a situation where the device is being used and improve convenience.

Modified Example 1

In the above embodiment, in the case that the situation determining unit 52 determines that the present situation is not a situation where a behavior pattern identified from the life log is likely to be performed, the wrist terminal 1 acquires life log of the present by performing the short-term life log acquiring process and changes its settings.

On the other hand, in the case that it is determined that the present situation is not a situation where a behavior pattern identified from the life log is likely to be performed, the situation determining unit 52 may determine whether or not there is any behavior pattern in the life log which is similar to the present situation and the wrist terminal 1 may change its settings referring to the similar behavior pattern.

Specifically, while behaviors having the same elements such as a day of week, a time of day and a behavior description are classified as the same behavior pattern, behavior patterns having elements identical in a certain percentage can be determined as similar behavior patterns even though some elements are not identical between the behavior patterns.

For example, in the case that it turns out that the user of the wrist terminal 1 is doing warm-up exercise at 19:50 Sunday, the situation determining unit 52 determines that the present situation is not the situation where the behavior pattern identified from the life log is likely to be performed because the day of week is not the same as that of the behavior pattern identified from the life log (i.e. not Saturday).

In this case, referring to other behavior patterns of the life log, a behavior pattern of jogging from 19:50 every Saturday around the house can be identified as a similar behavior pattern to the behavior of doing warm-up exercise at 19:50.

Then, the situation determining unit 52 determines that the present situation is a situation where a behavior pattern similar to one identified from the life log is likely to be performed. Further, the situation determining unit 52 specifies one or more kinds of functions of the wrist terminal 1 relating to the similar behavior pattern and outputs information indicating the similar behavior pattern and the specified one or more kinds of functions (device setting reference information) to the device setting unit 55.

By this, even though habitual behaviors are not done in completely the same situations (for example, they are done on different days of week), it is possible to set the function of the wrist terminal 1 more flexibly referring to behavior patterns of the user.

Therefore, it is possible to improve convenience of the wrist terminal 1.

The wrist terminal 1 as described above includes the life log acquiring unit 51, the situation determining unit 52, and the device setting unit 55.

The life log acquiring unit 51 acquires information on life log.

The situation determining unit 52 determines whether or not the present situation conforms to a behavior pattern of the life log based on the information on the life log.

The device setting unit 55 sets the function of the device according to behavior patterns based on the decision of the situation determining unit 52.

By this, it is possible to change the setting of the function of the wrist terminal 1 in accordance with the behavior which the wrist terminal 1 determines in light of the life log the user is going to do from now.

Thus, the user needs not to manually change settings of the function of the wrist terminal 1 in accordance with her activity and can use necessary functions of the wrist terminal 1 quickly after starting the activity. Further, as it is possible to activate only functions necessary for the user's activity, an increase of power consumption of the wrist terminal 1 can be suppressed.

Therefore, it is possible to improve convenience of the wrist terminal 1 capable of recording life log while suppressing power consumption.

The wrist terminal 1 also includes the life log information detecting unit 53.

In the case that it is determined that the present situation does not conform to a behavior pattern of the life log, the life log information detecting unit 53 detects information on life log from behaviors of the user for a predetermined time period.

The device setting unit 55 sets the function of the device based on the information on the life log detected by the life log information detecting unit 53.

By this, even in the case that the present situation does not conform to a behavior pattern of the life log, it is possible to change the setting of the function of the wrist terminal 1 in accordance with an activity identified from the present situation.

Further, in the case that the situation determining unit 52 determines that the present situation does not conform to a behavior pattern of the life log, it determines whether or not there is a behavior pattern of the life log similar to the present situation.

In the case that the situation determining unit 52 determines that there is a behavior pattern of the life log similar to the present situation, the device setting unit 55 sets the function of the device in accordance with the similar behavior pattern.

By this, even in the case that habitual behaviors in the user's daily life are not done in completely the same situations (for example, they are done on different days of week), it is possible to set the function of the wrist terminal 1 more flexibly referring to behavior patterns of the user.

Therefore, it is possible to improve convenience of the wrist terminal 1.

Further, the invention is not limited to the embodiments described above and any modifications or alternatives which can achieve the object of the invention fall within the scope of the invention.

Although the situation determining unit 52 automatically identifies behavior patterns in the above described embodiments, the present invention is not limited thereto. In other words, the user may register behavior patterns in the life log. For example, the user can register a behavior pattern of "doing warm-up exercise and jogging around the house from 19:50 to 21:00 every Saturday" in the life log. In this case, it is possible to determine whether or not the present situation is a situation where a behavior pattern identified from the life log is likely to be performed referring to the registered behavior patterns.

Further, although the situation determining unit 52 automatically specifies kinds of functions of the wrist terminal 1 relating to a behavior pattern identified from the life log in the above described embodiments, the present invention is not limited thereto. In other words, when a behavior pattern is performed, the functions of the wrist terminal 1 may be set in accordance with characteristics of the behavior pattern and this setting may be stored. In this case, in the case that it is determined that the present situation is a situation where the behavior pattern identified from the life log is likely to be performed, the device setting unit 55 changes the setting of the function of the wrist terminal 1 in accordance with the stored setting for the characteristics of the behavior pattern.

Furthermore, although an electronic device to which the present invention has been applied is the wrist terminal 1 in the above described embodiments, the present invention is not especially limited thereto.

For example, the present invention is applicable to a general electronic device having a function of recording life log. More specifically, the present is applicable to, for example, a notebook type personal computer, a mobile phone, a smart phone, a portable game device, and the like.

A sequence of the processes described above can be executed by hardware or software.

In other words, the functional configuration shown in FIG. 2 is merely an example and the present invention is not limited thereto. The wrist terminal 1 suffices in the case that it has a function for performing the sequence of the processes as a whole, and functional blocks to use to implement this function are not limited to the embodiment of FIG. 2.

In addition, a functional block may be configured by a piece of hardware, a piece of software, or their combination.

In the case of executing the sequence of the processes by software, a program configuring the software is installed in a computer or the like from a network or a recording medium.

The computer may be a computer which is incorporated in dedicated hardware. In addition, the computer may be a computer capable of executing various functions by installing various programs therein, for example, a general-purpose personal computer.

A recording medium for recording such a program consists of not only a removable media which is distributed separately from the device's main body to provide it to users, but also a recording medium or the like which is provided to users in a state of being incorporated in the device's main body in advance. The removable media includes, for example, a magnetic disk (including a floppy disk), an optical disc, a magneto-optical disk, or the like. The optical disc includes, for example, a compact disk-read only memory (CD-ROM), a digital versatile disk (DVD), a Blu-ray Disc (Registered Trademark), or the like. The magneto-optical disk includes a Mini-Disk (MD), or the like. In addition, the recording medium which is provided to the users in a state of being incorporated in the device's main body in advance includes, for example, the ROM 16 in FIG. 1B in which a program is recorded, or the like.

Further, in the description presented here, the steps describing a program recorded in a recording medium include not only processes to be executed serially in time in order, but also processes which are not necessarily executed serially in time but in a parallel manner or individually.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An electronic device comprising:
   one or more functional elements comprising a sensor configured to perform sensing;
   a processor; and
   a computer-readable recording medium in which one or more computer programs are stored, wherein the one or more computer programs cause the processor to perform operations to:
   detect a present behavior of a user;
   acquire first behavior log information of the user that is previously stored;
   determine whether the present behavior of the user conforms to a behavior pattern indicated by the first behavior log information of the user;
   in response to determining that the present behavior of the user conforms to the behavior pattern indicated by the first behavior log information of the user, activate or deactivate the sensor based on the behavior pattern indicated by the first behavior log information of the user; and
   in response to determining that the present behavior of the user does not conform to the behavior pattern indicated by the first behavior log information of the user:
   detect second behavior log information of the user from the present behavior of the user; and
   activate or deactivate the sensor based on a behavior pattern indicated by the second behavior log information of the user.

2. The electronic device of claim 1, further comprising:
   a transmitter,
   wherein the one or more computer programs cause the processor to perform operations to:
   acquire the first behavior log information of the user by receiving the first behavior log information of the user from a predetermined server; and
   in response to determining that the present behavior of the user does not conform to the behavior pattern indicated by the first behavior log information of the user, control the transmitter to transmit the second behavior log information of the user as new behavior log information to the predetermined server.

3. The electronic device of claim 1,
   wherein the first behavior log information of the user comprises location information,
   wherein the present behavior comprises a present location of the electronic device, and
   wherein the one or more computer programs cause the processor to perform operations to determine whether the present behavior of the user conforms to the behavior pattern indicated by the first behavior log information of the user by comparing the present location of the electronic device and the location information of the first behavior log information of the user.

4. The electronic device of claim 1,
   wherein the first behavior log information of the user comprises time of day information,
   wherein the present behavior comprises a present time of day, and
   wherein the one or more computer programs cause the processor to perform operations to determine whether the present behavior of the user conforms to the behavior pattern indicated by the first behavior log information of the user by comparing the present time of day and the time of day information of the first behavior log information of the user.

5. The electronic device of claim 1,
   wherein the one or more functional elements further comprise a receiver configured to receive a signal including location information from a positioning satellite,
   wherein the one or more computer programs cause the processor to perform operations to, in response to determining that the present behavior of the user conforms to the behavior pattern indicated by the first behavior log information of the user, set a time interval for controlling the receiver to receive the signal based on the behavior pattern indicated by the first behavior log information of the user.

6. The electronic device of claim 1,
   wherein the one or more computer programs cause the processor to perform operations to:
   in response to determining that the present behavior of the user does not conform to the behavior pattern indicated by the first behavior log information of the user, detect, as the second behavior log information, the present behavior of the user for a predetermined time period.

7. The electronic device according to claim 1,
   wherein the one or more computer programs cause the processor to perform operations to:

in response to determining that the present behavior of the user does not conform to the behavior pattern indicated by the first behavior log information of the user:

determine whether a third behavior log information of the user that is previously stored can be acquired, wherein the third behavior log information indicates a behavior pattern that is similar to the present behavior of the user; and     in response to determining that the third behavior log information of the user can be acquired:

acquire the third behavior log information; and         activate or deactivate the sensor based on the behavior pattern indicated by the third behavior log information of the user.

8. A method for controlling an electronic device comprising a processor and one or more functional elements comprising a sensor configured to perform sensing, the method comprising:

causing the processor of the electronic device to perform operations to:

detect a present behavior of a user;

acquire first behavior log information of the user that is previously stored;

determine whether the present behavior of the user conforms to a behavior pattern indicated by the first behavior log information of the user;

in response to determining that the present behavior of the user conforms to the behavior pattern indicated by the first behavior log information of the user, activate or deactivate the sensor based on the behavior pattern indicated by the first behavior log information of the user; and     in response to determining that the present behavior of the user does not conform to the behavior pattern indicated by the first behavior log information of the user:

detect second behavior log information of the user from the present behavior of the user; and         activate or deactivate the sensor based on a behavior pattern indicated by the second behavior log information of the user.

9. A non-transitory computer-readable recording medium having instructions stored thereon that when executed by a processor of an electronic device, wherein the electronic device comprises one or more functional elements comprising a sensor configured to perform sensing, cause the electronic device to:

detect a present behavior of a user;

acquire first behavior log information of the user that is previously stored;

determine whether the present behavior of the user conforms to a behavior pattern indicated by the first behavior log information of the user;

in response to determining that the present behavior of the user conforms to the behavior pattern indicated by the first behavior log information of the user, activate or deactivate the sensor based on the behavior pattern indicated by the first behavior log information of the user; and     in response to determining that the present behavior of the user does not conform to the behavior pattern indicated by the first behavior log information of the user:

detect second behavior log information of the user from the present behavior of the user; and         activate or deactivate the sensor based on a behavior pattern indicated by the second behavior log information of the user.

10. The electronic device according to claim 1, wherein the one or more functional elements comprises a receiver configured to receive a signal including location information from a positioning satellite, and wherein the one or more computer programs cause the processor to, in response to determining that the present behavior of the user conforms to the behavior pattern indicated by the first behavior log information of the user, perform operations to set a time interval for activating and controlling the receiver to receive the signal based on the behavior pattern indicated by the first behavior log information of the user.

11. The electronic device according to claim 1, wherein the behavior pattern indicated by the first behavior log information of the user is associated with a predetermined start time, wherein the one or more computer programs cause the processor to perform operations to:

acquire the first behavior log information at a preset time before the predetermined start time; and     in response to determining that the present behavior of the user conforms to the behavior pattern indicated by the first behavior log information of the user, activate or deactivate the sensor based on the behavior pattern indicated by the first behavior log information of the user before the predetermined start time.

12. A wrist terminal comprising the electronic device according to claim 1.

13. The electronic device according to claim 1, wherein the one or more functional elements comprise a user interface configured to receive a user input, and wherein the one or more computer programs cause the processor to perform operations to:

in response to determining that the present behavior of the user conforms to the behavior pattern indicated by the first behavior log information of the user, activate or deactivate the user interface based on the behavior pattern indicated by the first behavior log information of the user; and     in response to determining that the present behavior of the user does not conform to the behavior pattern indicated by the first behavior log information of the user:

activate or deactivate the user interface based on the behavior pattern indicated by the second behavior log information of the user.

14. The electronic device according to claim 1, wherein the one or more functional elements comprise a display configured to display information, and wherein the one or more computer programs cause the processor to perform operations to:

in response to determining that the present behavior of the user conforms to the behavior pattern indicated by the first behavior log information of the user, activate or deactivate the display based on the behavior pattern indicated by the first behavior log information of the user; and     in response to determining that the present behavior of the user does not conform to the behavior pattern indicated by the first behavior log information of the user:

activate or deactivate the display based on the behavior pattern indicated by the second behavior log information of the user.

\* \* \* \* \*